United States Patent
Ahlstrom et al.

(10) Patent No.: US 9,301,224 B2
(45) Date of Patent: Mar. 29, 2016

(54) METHOD AND APPARATUS IN A NETWORK NODE FOR ESTABLISHING NEIGHBOR CELL RELATIONS IN A WIRELESS NETWORK

(75) Inventors: Tobias Ahlstrom, Ljungsbro (SE); Fredrik Gunnarsson, Linköping (SE); Elisabeth Hansson, Linköping (SE); Karl Norrman, Stockholm (SE); Elena Myhre, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/379,402

(22) PCT Filed: Feb. 27, 2012

(86) PCT No.: PCT/EP2012/053253
§ 371 (c)(1),
(2), (4) Date: Aug. 18, 2014

(87) PCT Pub. No.: WO2013/127424
PCT Pub. Date: Sep. 6, 2013

(65) Prior Publication Data
US 2015/0038144 A1    Feb. 5, 2015

(51) Int. Cl.
*H04W 36/00* (2009.01)
*H04W 24/02* (2009.01)

(52) U.S. Cl.
CPC .......... *H04W 36/0083* (2013.01); *H04W 24/02* (2013.01)

(58) Field of Classification Search
CPC ............................................... H04W 36/0083
See application file for complete search history.

(56) References Cited

U.S. PATENT DOCUMENTS

| 2007/0207822 A1* | 9/2007 | Andersson | H04W 36/12 455/502 |
| 2012/0142337 A1* | 6/2012 | Wang | H04W 24/04 455/424 |
| 2013/0083658 A1* | 4/2013 | Vasseur | H04W 28/021 370/230.1 |

FOREIGN PATENT DOCUMENTS

| WO | 2010/026438 A1 | 3/2010 |
| WO | WO 2010026438 A1 * | 3/2010 |
| WO | 2011/162651 A1 | 12/2011 |

OTHER PUBLICATIONS

3GPP, LTE; "3rd Generation Partnership Project; Technical Specification Group Radio Access Network; Evolved Universal Terrestrial Radi Access (E-UTRA) and Evolved Universal Terrestrial Radio Access Network (E-UTRAN); Overall description; Stage 2 (Release 10)"; 3GPP TS 36.300 V10.1.0 (Sep. 2010) Technical Specification; Sep. 2010; pp. 1-192.

(Continued)

*Primary Examiner* — Sam K Ahn
*Assistant Examiner* — Fabricio R Murillo Garcia
(74) *Attorney, Agent, or Firm* — Patent Portfolio Builders PLLC

(57) ABSTRACT

Disclosed is a method in a network node (106) for establishing neighbor cell relations in a wireless network for a source cell (107) served by the network node (106). The method comprises establishing (34) a temporary neighbor cell relation for a received unknown neighbor cell identification; verifying (36) validity of the temporary neighbor cell relation, and establishing (38) a permanent neighbor cell relation based on the established temporary neighbor cell relation, if the temporary neighbor cell relation is found valid, thus avoiding that a false neighbor cell identification results in a faulty permanent neighbor cell relation. Disclosed is also a corresponding apparatus in a network node for establishing neighbor cell relations in a wireless network.

14 Claims, 6 Drawing Sheets

(56) References Cited

OTHER PUBLICATIONS

3GPP, LTE; "3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)"; 3GPP TR 32.816 V8.0.0 (Dec. 2008) Technical Report; Dec. 2008; pp. 1-38.

3GPP, LTE; "3rd Generation Partnership Project; Technical Specification Group Radio Access Network; Feasibility study for Further Advancements for E-UTRA (LTE-Advanced) (Release 9)"; 3GPP TR 36.912 V9.3.0 (Jun. 2010) Technical Report; Jun. 2010; pp. 1-61.

3GPP, LTE; "3rd Generation Partnership Project; Technical Specification Group Radio Access Network; Evolved Universal Terrestrial Radio Access (E-UTRA); Relay architectures for E-UTRA (LTE-Advanced) (Release 9)"; 3GPP TR 36.806 V9.0.0 (Mar. 2010) Technical Report; Mar. 2010; pp. 1-34.

Rapporteur (NTT DOCOMO); "TR36.912 Annex A3: Self evaluation results"; 3GPP TSG RAN Meeting #45; RP-090738; Sep. 15-18, 2009; p. 1; Seville, Spain. [downloaded from the internet at http://www.3gpp.org/ftp/tsg_ran/tsg_ran/TSGR_45/Documents].

Rapporteur (NTT DOCOMO); "TR36.912 Annex A3: Self evaluation results"; 3GPP TSG RAN Meeting #45; RP-090744; Sep. 15-18, 2009; p. 1; Seville, Spain. [downloaded from the internet at http://www.3gpp.org/ftp/tsg_ran/tsg_ran/TSGR_45/Documents].

3GPP; "LTE; FDD RIT component of SRIT 'Release 10 & beyond (LTE-Advanced)'"; (source: RP-090745); Sep. 22, 2009; p. 1-52. [downloaded from the Internet at http://www.3gpp.org/ftp/tsg_ran/tsg_ran/TSGR_45/Documents].

3GPP; "LTE; FDD RIT component of SRIT 'Release 10 & beyond (LTE-Advanced)'"; (source: RP-090746); Table 1; Link budget template for indoor test environment (indoor hotspot deployment scenario) Annex C2 Link Budget Template LOS; Sep. 18, 2009; pp. 1-42. [downloaded from the internet at http://www.3gpp.org/ftp/tsg_ran/tsg_ran/TSGR_45/Documents].

3GPP; "LTE; FDD RIT component of SRIT 'Release 10 & beyond (LTE-Advanced)'"; (source: RP-090746); Table 1; Link budget template for indoor test environment (indoor hotspot deployment scenario) Annex C2 Link Budget Template NLOS; Sep. 18, 2009; pp. 1-42. [downloaded from the internet at http://www.3gpp.org/ftp/tsg_ran/tsg_ran/TSGR_45/Documents].

3GPP; "LTE; FDD RIT component of SRIT 'Release 10 & beyond (LTE-Advanced)'"; (source: RP-090747); Sep. 18, 2009; p. 1-8. [downloaded from the internet at http://www.3gpp.org/ftp/tsg_ran/tsg_ran/TSGR_45/Documents].

3GPP; "RP-090998: Extract of 3GPP Release 8 Specifications"; Specifications as of Mar. 2009; pp. 18. [downloaded from the internet at http://www.3gpp.org/ftp/tsg_ran/tsg_ran/TSGR_45/Documents].

International Search Report issued in corresponding International application No. PCT/EP2012/053253, date of mailing Nov. 21, 2012.

Written Opinion of the International Searching Authority issued in corresponding International application No. PCT/EP2012/053253, date of mailing Nov. 21, 2012.

Nokia Corporation et al., "ANR Security Risk," 3GPP Draft; R2-105728 ANR Security, 3rd Generation Partnership Project (3GPP), 3GPP TSG-RAN WG2 Meeting #71 bis; Xian, China, Oct. 11-15, 2010.

CMCC, "ANR Function Split Between eNB and O&M," 3GPP Draft; R3-082135, 3rd Generation Partnership Project (3GPP), 3GPP TSG-RAN WG3 Meeting #61; Jeju Island, Korean, Aug. 18-22, 2008.

* cited by examiner

METHOD AND APPARATUS IN A NETWORK NODE FOR ESTABLISHING NEIGHBOR CELL RELATIONS IN A WIRELESS NETWORK

TECHNICAL FIELD

The present disclosure relates generally to a method and an apparatus in a network node for establishing neighbor cell relations in a wireless network.

BACKGROUND

A wireless network, exemplified by a Long Term Evolution (LTE) network 100 is described in FIG. 1. Such a network comprises base stations, eNodeBs 102, 104, 106, which eNodeBs may provide coverage in one or more cells 103, 105, 107. The eNodeBs 102, 104, 106 each communicate with an MME 109 via an S1 interface. Further, the eNodeBs may communicate directly with each other via X2-interfaces. FIG. 1 further shows a user equipment (UE) 110 located in cell 107 and communicating wirelessly with eNodeB 106.

To be able to e.g. perform handover of UEs to neighbor cells, each eNodeB needs information about its neighbor cells. For this reason, each eNodeB maintains a neighbor relation table (NRT) for each cell it is managing. Each entry in such a table contains information that the eNodeB needs to know about a neighbor cell. For example, a first cell 107 has an NRT containing information about its neighboring cells 103 and 105.

Traditionally, NRTs have been built up using cell planning tools for coverage predictions before a base station is installed. Prediction errors, due to imperfections in map and building data, forced the operators to resort to drive and/or walk tests to control coverage regions and identify handover regions. This is significantly simplified in LTE by using a feature called automatic neighbor relation (ANR). The function of the ANR is to automatically add and remove neighbor relation entries to/from the NRT. Thereby, it is not necessary to perform drive tests. Instead, the NRTs are automatically built up and updated during use of the network.

In ANR, the UEs are adapted to decode and report cell identifications (cell ID) and other data of neighboring cells that it comes into contact with to its own base station, upon request. Taking the example shown in FIG. 1, UE 110 residing in cell 107 may, when it gets into contact with eNodeB 102 serving cell 103, report cell ID of cell 103 to eNodeB 106. For enabling the UE to get in contact with eNodeBs, each eNodeB broadcasts an identifying signature comprising its cell ID. In LTE, the cell ID may be a Physical Cell Identity (PCI). The PCI is not a unique ID and can therefore not be used to uniquely identify a neighbor cell. Therefore, the cell also broadcasts a globally unique cell identifier, such as Evolved Cell Global Identifier (ECGI), which is built up of a Public Land Mobile Network (PLMN) identity and a cell ID. The ECGI may later used by the eNodeB 106 to signal to the eNodeB 102 via the MME 109 over S1-interfaces. The ECGI is also used when acquiring via the MME 109 the IP address of eNodeB 102, which is used for establishing an X2 interface between eNodeB 106 and eNodeB 102.

The ANR may function in the following way, when the UE detects a cell that meets a configured reporting criterion, e.g. cell 102 in FIG. 2, the UE sends 2.1 a measurement report comprising a PCI of the cell 102, to the eNodeB 106. The UE may send the measurement report as a response to a report configuration of event based measurements or periodical measurements. The eNodeB 106 checks 2.2 whether the PCI is already known to the eNodeB or not. If the PCI is unknown to the eNodeB, the eNodeB 106 sends 2.3 a message to the UE to detect or decode ECGI for the cell 102. Thereafter, the UE sends 2.4 a measurement report to the eNodeB 106 comprising the detected ECGI of cell 102. The eNodeB then uses the ECGI to set up 2.5 a new neighbor cell relation with the cell 102. The established new neighbor cell relation is entered as a new entry in the neighbor relation table of cell 107/eNodeB 106. Further, the neighbor cell relation is reported to an O&M system of the wireless network, and an X2-interface is established between eNodeB 107 and eNodeB 103.

When using the ANR, there is a risk that a UE reports PC's and ECG's that has actually not been observed, i.e. faulty PC's or ECG's. This may be the case if a person has tampered with the UE, or if there for some reason is a fake or modified eNodeB in the wireless network. If a UE has reported a PCI or ECGI that has not been correctly received from a neighboring cell, a neighbor cell relation is established at the eNodeB the UE is connected to, which neighbor cell relation will not lead to any physical eNodeB controlling a physical cell. As a result, faulty X2 interfaces may be set up and/or handovers may try to be performed via a non-existing link resulting in failed handovers, lost calls, and UEs dropping form the network. Also, there is a risk that the NRT will be filled with faulty PC's and CGIs, which also may result in failed handover and UE drops. Eventually, a system breakdown may be the case.

SUMMARY

It is an object of the invention to address at least some of the problems and issues outlined above. It is possible to achieve these objects and others by using a method and an apparatus as defined in the attached independent claims.

According to one aspect, a method is provided in a network node for establishing neighbor cell relations in a wireless network for a source cell served by the network node. The method comprises: establishing a temporary neighbor cell relation for a received unknown neighbor cell identification; verifying validity of the temporary neighbor cell relation; establishing a permanent neighbor cell relation based on the established temporary neighbor cell relation, if the temporary neighbor cell relation is found valid, thus avoiding that a false neighbor cell identification results in a faulty permanent neighbor cell relation.

A neighbor cell relation is defined as permanent if it is stored in a neighbor relation table, NRT, of the network node, and/or if it is reported to an operation and management node of the wireless network. Further, a permanent neighbor cell relation may, in a LTE network, lead to an establishment of an X2-connection from the network node (which is an eNodeB in LTE) towards a network node serving a target cell having the neighbor cell identification. In comparison, a temporary neighbor cell relation is a relation for which the cell identification is stored at the network node, but wherein the relation is not stored in the NRT and not reported to the O&M node. Further, no X2-connection is established based on the temporary neighbor cell relation. Moreover, no statistics may be reported on behalf of temporary neighbor cell relations; statistics may only be reported on behalf of permanent neighbor cell relations. The neighbor cell identification being unknown to the network node may mean that the neighbor cell ID is not known of before by the network node, or it may mean that the neighbor cell ID is not stored in the NRT or verified as a permanent neighbor cell relation. The network node may be a base station such as an eNodeB in an LTE network or a radio network controller as in a WCDMA network.

Thereby, irrelevant permanent neighbor cell relations are prevented, which prevents possible failed handovers and UEs dropping off the network due to faulty reports of neighbor cell identifications. Further, possible establishment of irrelevant direct connections between base stations, e.g. X2-interfaces, are prevented. Further, excessive use of storage space for irrelevant permanent neighbor cell relations is avoided. Further, such a method ensures trust in the ANR feature.

According to another aspect, an apparatus is provided in a network node for establishing neighbor cell relations in a wireless network for a source cell served by the network node. The apparatus comprises a receiver for receiving an unknown neighbor cell identification The apparatus further comprises a first establishing unit for establishing a temporary neighbor cell relation for the received neighbor cell identification, a verifying unit for verifying validity of the temporary neighbor cell relation, and a second establishing unit for establishing a permanent neighbor cell relation based on the established temporary neighbor cell relation, if the temporary neighbor cell relation is found valid, thus avoiding that a false neighbor cell identification results in a faulty permanent neighbor cell relation.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

As described below, a solution is provided that will avoid or at least lower the risk of faulty reported cell identifiers leading to wrongly established neighbor cell relations, which in turn may lead to handover problems and excessive usage of communication resources. Briefly described, the solution to this problem may be to establish a temporary neighbor cell relation, which is only stored and established in the eNodeB. This temporary cell relation is validated before a permanent neighbor cell relation is established, which is reported to the O&M-system and used to set up an X2-connection. To establish a temporary cell relation may only comprise to store the unknown neighbor cell identification.

Figure 1:
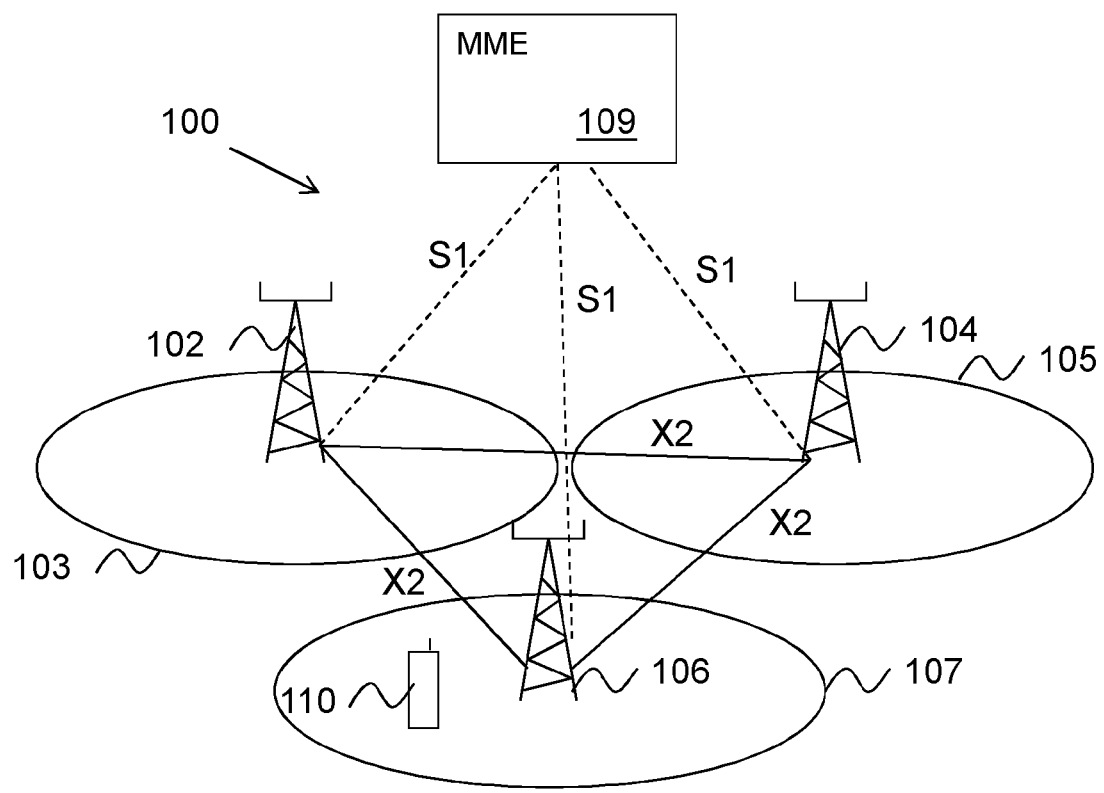
FIG. 1 is a schematic block diagram of a wireless network in which embodiments disclosed may be implemented.
Figure 2:
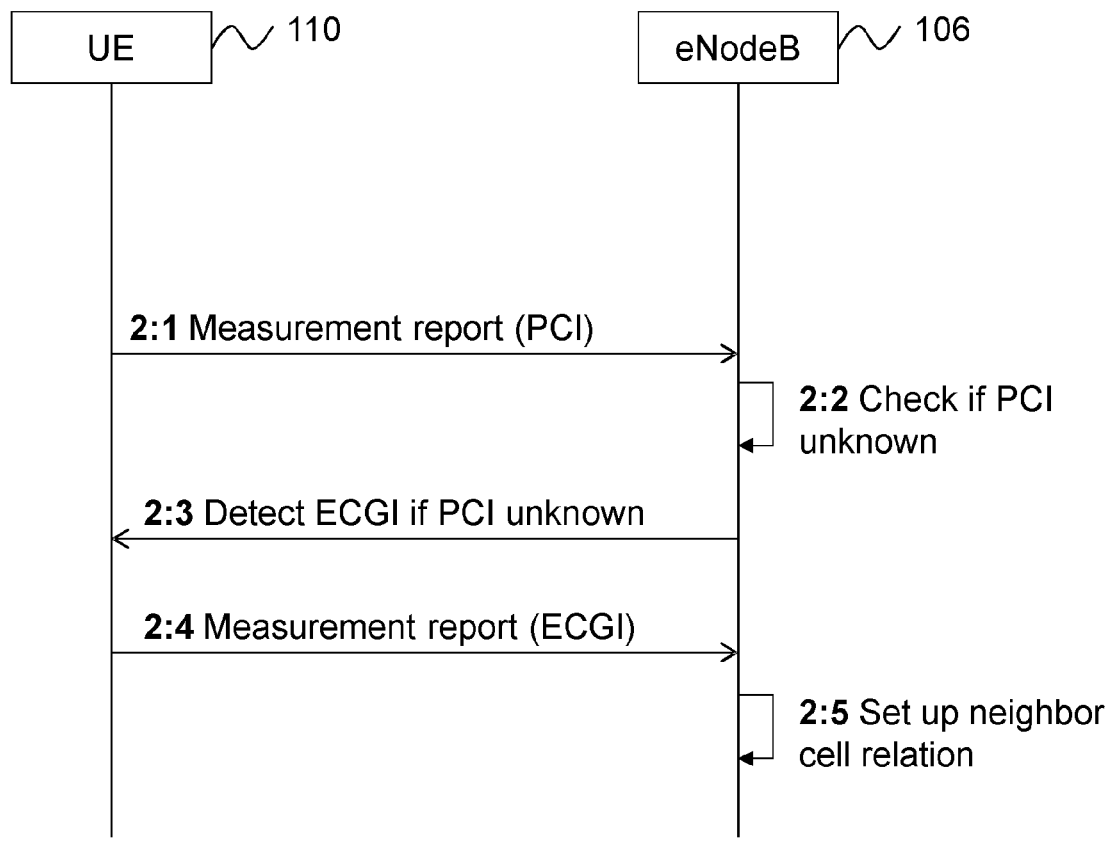
FIG. 2 is a signaling diagram illustrating a neighbor cell relation establishment procedure according to the prior art.
Figure 3:
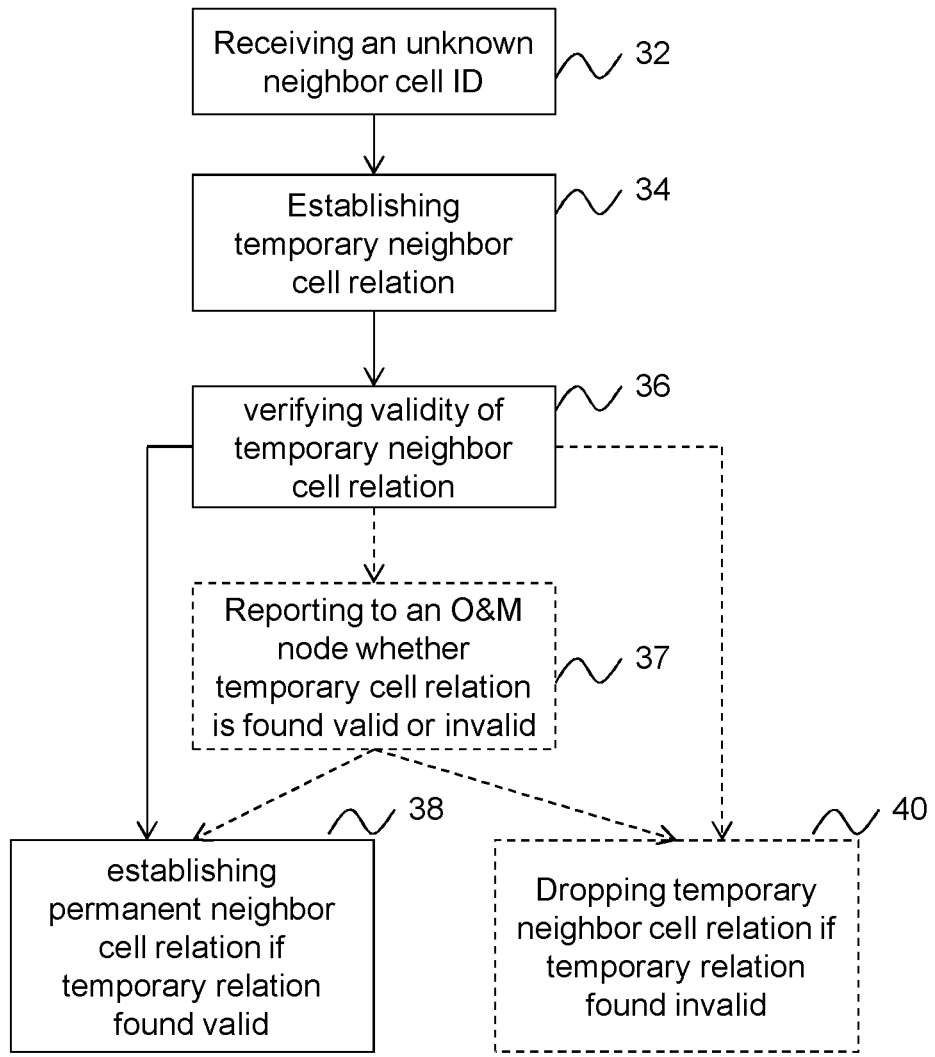
FIG. 3 is a flow chart illustrating a procedure for establishing a neighbor cell relation in a network node, according to a possible embodiment.

FIG. 3 describes a method in a network node 106 according to an embodiment for establishing neighbor cell relations in a wireless network for a source cell 107 served by the network node 106. The method comprises: establishing 34 a temporary neighbor cell relation for a received unknown neighbor cell identification, verifying 36 validity of the temporary neighbor cell relation, and establishing 38 a permanent neighbor cell relation based on the established temporary neighbor cell relation, if the temporary neighbor cell relation is found valid. Thereby it is avoided that a false neighbor cell identification results in a faulty permanent neighbor cell relation.

According to another embodiment, the temporary neighbor cell relation is dropped 40 if the temporary neighbor cell relation is found invalid.

According to an embodiment, the method may start by receiving 32 the unknown neighbor cell identification. In one alternative, the unknown neighbor cell relation is received from a UE 100 positioned in the source cell served by the network node 106. Alternatively, another temporary neighbor cell relation is received from another network node, the another temporary neighbor cell relation comprising the neighbor cell identification.

According to yet another embodiment, the network node reports 37 to an operation and maintenance (O&M) node of the network whether the temporary neighbor cell relation is found valid. Further the network node may also report to the O&M node of the network whether the temporary neighbor cell relation is found invalid. The reporting to the O&M node may be performed either before establishing a permanent neighbor cell relation or dropping a temporary neighbor cell relation, as shown in FIG. 3, or after the steps of establishing and dropping.

According to an embodiment, an X2 connection or interface may be set up to a network node managing a cell with the (previously unknown) cell identification, when the temporary neighbor cell relation has been found valid.

Figure 4:
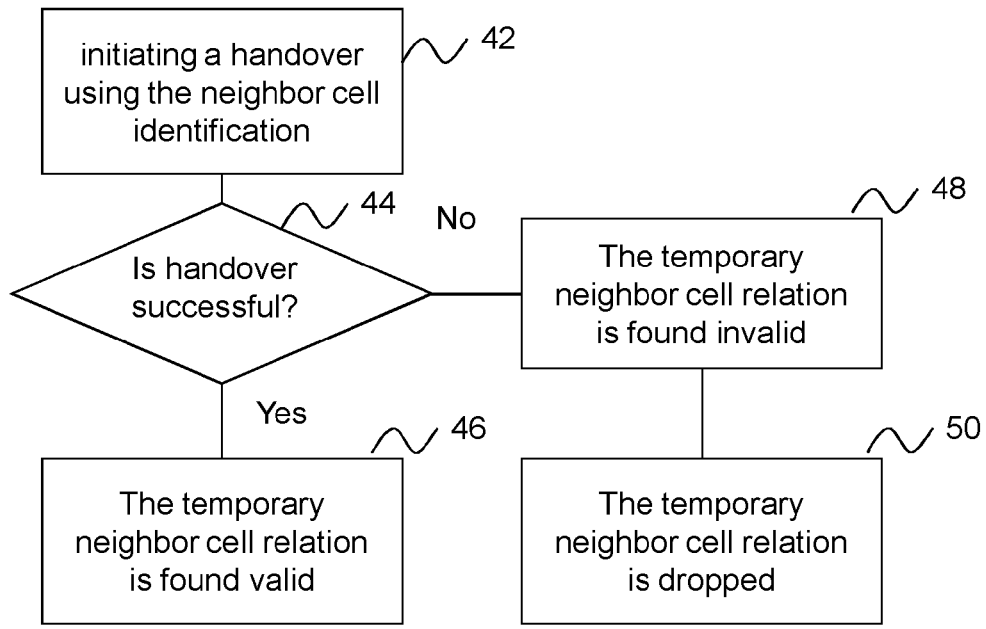
FIG. 4 is a flow chart illustrating a procedure for validating a temporary cell relation, according to a possible embodiment.

FIG. 4 illustrates a procedure for validating 36 a temporary neighbor cell relation, according to a possible embodiment. This procedure starts by initiating 42 a handover using the neighbor cell identification of the temporary neighbor cell relation. The handover may be initiated via a core network node, which may be an MME. If the handover is successful 44, the temporary cell relation is found valid 46. On the other hand, if the handover fails 44, the temporary neighbor cell relation may be found invalid 48. Consequently, the temporary neighbor cell relation is dropped 50.

Figure 5:
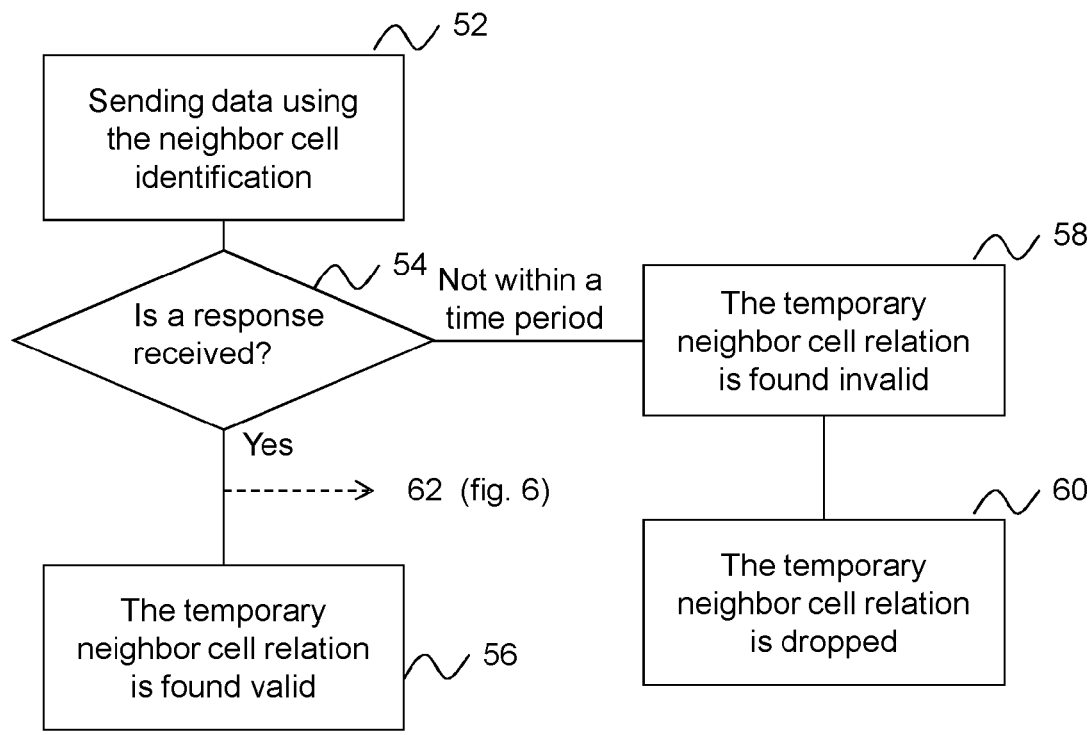
FIG. 5 is a flow chart illustrating a procedure for validating a temporary cell relation, according to another possible embodiment.

FIG. 5 illustrates another procedure for validating 36 a temporary neighbor cell relation, according to a possible embodiment. This procedure starts by the network node sending 52 data intended to the target network node serving a target cell having the neighbor cell identification, using the neighbor cell identification of the temporary neighbor cell relation. The data or the message that comprises the data requests a response. If a response is received 54 from the target network node, the temporary neighbor cell relation is found valid. The data may be sent via a core network node, which may be an MME. On the other hand, if a response is not received within a certain time period, the temporary neighbor cell relation may be found invalid 58, and the temporary neighbor cell relation may be dropped 60. The time period may be a predefined time period. According to another embodiment, after receiving a response, the temporary cell relation may be further validated according to the procedure described in relation to FIG. 6.

Figure 6:
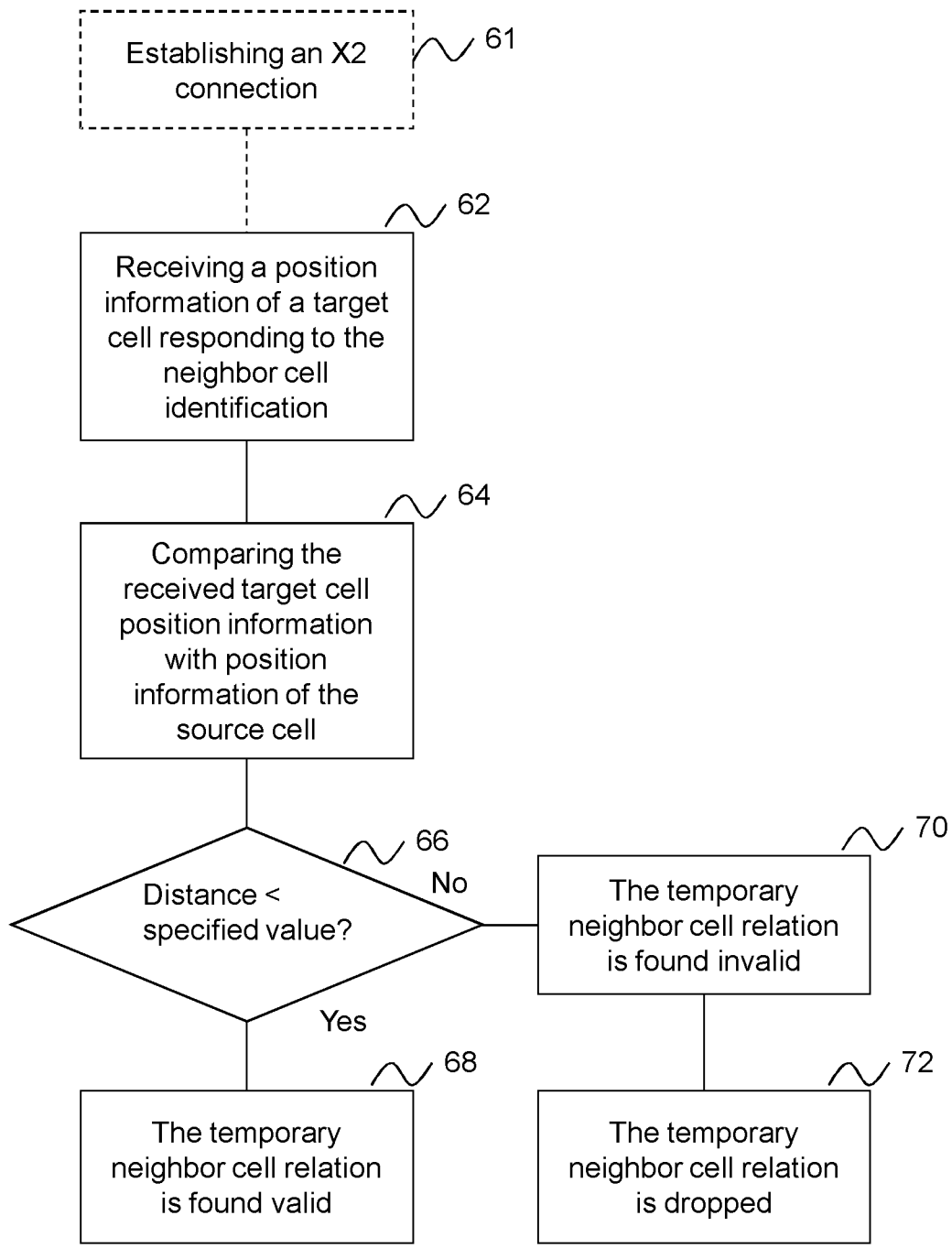
FIG. 6 is a flow chart illustrating a procedure for validating a temporary cell relation, according to yet another possible embodiment.

FIG. 6 illustrates yet another embodiment of a procedure for validating 36 a temporary neighbor cell relation. This procedure may start by receiving 62 position information of a target cell responding to the neighbor cell identification. This response may have been received by the embodiment described in relation to FIG. 5. In this case, the procedure of FIG. 6 may in addition to control validation of temporary neighbor cell relation based on reception of an answer also control validation based on position information of the found target cell. I.e. if a response is received the network node will also check position of the target cell before the temporary neighbor cell relation can be validated. After receiving the position information of the target cell, the network node may compare 64 the received target cell position information with position information of the source cell. If the distance between the target cell and the source cell is found to be longer than a specified value, the temporary neighbor cell relation is found invalid 70. Thereafter, the temporary neighbor cell relation may be dropped 72. Such a method may prevent that a neighbor cell relation is set up between a cell that indeed exists but that is not a neighbor cell, for example it is prevented that a temporary neighbor cell relation is set up between a cell in Gothenburg and a cell in Stockholm. The procedure of FIG. 6 may also have a step in which, if the distance between the target cell and the source cell is found to be shorter than a specified value, the temporary cell relation is found valid 68. The position information of the target cell may be received via a core network node, which may be an MME. Further; the procedure of FIG. 6 may start by establishing 61 a direct connection between the network node serving the source cell and the network node serving the target cell. The direct connection may be an X2-connection. This direct connection is then taken down if the temporary neighbor cell relation is found invalid.

According to another embodiment, the temporary neighbor cell relation is found invalid 40 if the temporary neighbor cell relation has not been used for any handover within a specified time period from the time when the temporary cell relation was established.

According to yet another embodiment, to establish 38 a permanent neighbor cell relation comprises storing the neighbor cell relation in a neighbor relation table in the network node. The step of establishing a permanent neighbor cell relation may further comprise reporting the permanent relation to the O&M node. Further, establishment of a direct connection, e.g. an X2-connection towards the target cell may be performed when the permanent neighbor cell relation is established.

According to an embodiment for an LTE network, the neighbor cell identification may be a PCI or an ECGI. If the neighbor cell identification received by the network node, i.e. the serving (or source) eNodeB, is a PCI, the serving eNodeB may respond by requesting an ECGI form the UE. When receiving the ECGI the serving eNodeB proceeds by establishing the temporary neighbor cell relation using the ECGI. More specifically, the eNodeB may extract the eNodeB identification for the target eNodeB serving the target cell from the ECGI and establish a temporary neighbor cell relation between the source cell and the target cell. The temporary neighbor cell relation is not added to the NRT and is not notified to the O&M system.

The temporary neighbor cell relation may be validated by the serving eNodeB initiating an S1 handover via S1 interfaces, i.e. via an MME to the target eNodeB using the temporary neighbor cell relation. If the S1 handover is successful (i.e. the serving eNodeB receiving an indication of successful handover, for example a UE context release command from the MME including the cause "Successful handover"), the temporary neighbor cell relation is considered validated. On the contrary, if the S1 handover fails, the temporary neighbor cell relation is considered invalid.

In an alternative embodiment, when the serving eNodeB has established the temporary neighbor cell relation, the temporary cell relation including the reported ECGI and/or PCI is validated via the S1-interface. The temporary neighbor cell relation is considered invalidated if signaling intended to the target eNodeB via MME using the reported ECGI as identifier fails. E.g. the target eNodeB may send an eNodeB configuration transfer message over the S1 interface containing a temporary eNodeB ID. The ECGI and PCI are considered invalidated if the serving eNodeB does not get a valid answer, at least within specified time.

In another embodiment, cells in the network can become aware of their position e.g. from a GPS based system or via information from a management system. This information can be sent upon request over the S1 or X2 interfaces. For example, a response comprising an X2 address over the S1 interface can also include information of the position of the target cell. Thus, the serving base eNodeB can calculate the distance between the target cell and the source cell. The temporary neighbor cell relation is considered invalidated if the distance between the target cell and the source cell is more than a specified value. However, sending the position of cells in messages over the S1 interfaces may require a change in the present standard. An alternative solution is to first set up an X2 interface or connection between the target cell and the source cell and then send information about position of cells over the X2 interface. The X2 interface is taken down, if the temporary neighbor cell relation becomes invalidated due to the distance calculation.

When a temporary neighbor cell relation has been validated, then a permanent neighbor cell relation is established, which is added to the NRT and reported to the O&M node. When the temporary neighbor cell relation has been validated, X2 interface setup can be considered. When a temporary neighbor cell relation has been invalidated, then the temporary neighbor cell relation is removed, or dropped.

Figure 7:
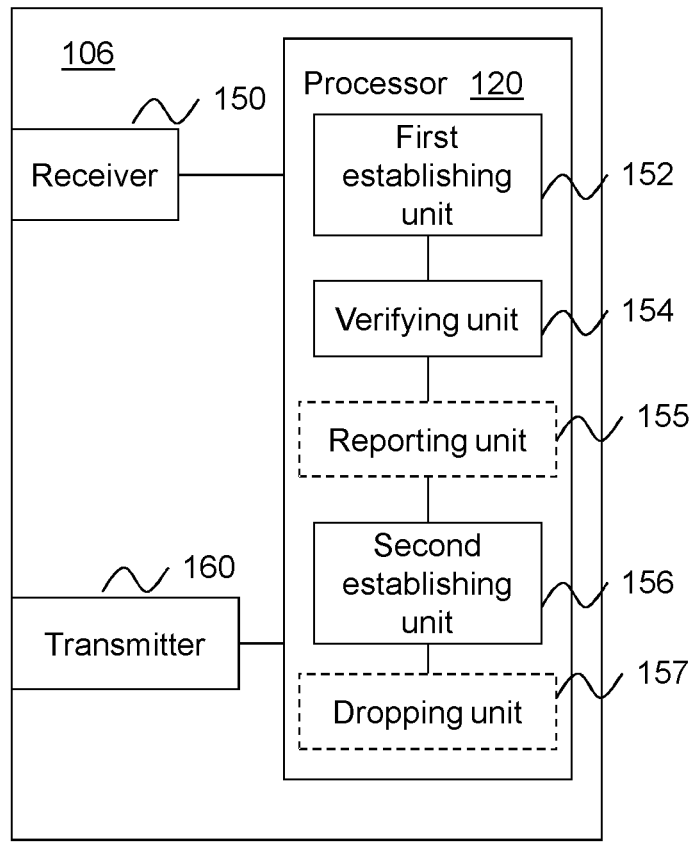
FIG. 7 is a block diagram illustrating a network node in more detail, according to further possible embodiments.

FIG. 7 shows a block diagram of an apparatus in a network node 106 for establishing neighbor cell relations in a wireless network for a source cell served by the network node. The apparatus comprises a receiver 150 for receiving an unknown neighbor cell identification. The apparatus further comprises a first establishing unit 152 for establishing a temporary neighbor cell relation for the received neighbor cell identification, a verifying unit 154 for verifying validity of the temporary neighbor cell relation, and a second establishing unit 156 for establishing a permanent neighbor cell relation based on the established temporary neighbor cell relation, if the temporary neighbor cell relation is found valid, thus avoiding that a false neighbor cell identification results in a faulty permanent neighbor cell relation.

The apparatus further has a transmitter 160 for transmitting data to other nodes and to UEs of the wireless network. Further, the receiver 150 may be arranged for receiving data from other nodes and from UEs of the wireless network. The receiver and the transmitter may be arranged in one unit called a transceiver.

According to an embodiment, the apparatus further comprises a dropping unit 157 for dropping the temporary neighbor cell relation if the temporary neighbor cell relation is found invalid.

According to an embodiment, the receiver 150 is arranged to receive the neighbor cell identification from a user equipment 100 positioned in the source cell served by the network node, or to receive another temporary neighbor cell relation from another network node, the another temporary neighbor cell relation comprising the neighbor cell identification. The another network node may be an O&M node, another network node in the radio access network or a network node in the core network.

According to another embodiment, the verifying unit 154 is further arranged to verify the validity of the temporary neighbor cell relation by initiating a handover for the user equipment to a target cell using the neighbor cell identification, and wherein the temporary neighbor cell relation is found valid if the handover is successful.

According to yet another embodiment, the verifying unit 154 is further arranged to verify the validity of the temporary neighbor cell relation by sending data to a target network node 102 serving a target cell 103 using the neighbor cell identification, the data requesting a response, and wherein the temporary neighbor cell relation is found valid if a response is received. The transmitter 160 may be arranged for performing the actual sending of the data to the target network node.

According to yet another embodiment, the verifying unit 154 is further arranged to verify the validity of the temporary neighbor cell relation by finding the temporary neighbor cell relation invalid if no response is received within a specified time period.

According to still another embodiment, the verifying unit 154 is further arranged to verify the validity of the temporary neighbor cell relation by receiving position information of a target cell responding to the neighbor cell identification and by comparing the received target cell position information with position information of the source cell. Further, the verifying unit 154 is arranged to find the temporary neighbor cell relation invalid if a distance between the target cell position information and the source cell position information is longer than a specified value. According to a variant of this embodiment, the first establishing unit 152 is further arranged for establishing a direct connection between the target cell and the source cell using the temporary neighbor cell relation before validating the temporary neighbor cell relation. In this case the position information of the target cell is received via the direct connection.

According to another embodiment, the verifying unit 154 is further arranged to find the temporary neighbor cell relation invalid if the temporary neighbor cell relation has not been used for any handover within a specified time period from the temporary cell relation was established.

According to yet another embodiment, the second establishing unit 156 is further arranged to establish a permanent neighbor cell relation by storing the permanent neighbor cell relation in a neighbor relation table in the network node.

According to yet another embodiment, the apparatus further comprises a reporting unit 155 for reporting to an operation and maintenance node whether the temporary cell relation is found valid or invalid.

While the solution has been described with reference to specific exemplary embodiments, the description is generally only intended to illustrate the inventive concept and should not be taken as limiting the scope of the solution. For example, the methods and apparatuses described might be used in many types of networks other than LTE based networks, for example in WCDMA based networks. The solution is defined by the appended claims.

The invention claimed is:

1. A method in a network node for establishing neighbor cell relations in a wireless network for a source cell served by the network node, comprising:
    establishing a temporary neighbor cell relation for a received unknown neighbor cell identification;
    verifying validity of the temporary neighbor cell relation;
    establishing a permanent neighbor cell relation based on the established temporary neighbor cell relation, if the temporary neighbor cell relation is found valid, thus avoiding that a false neighbor cell identification results in a faulty permanent neighbor cell relation;
    sending, by the network node, data to an unknown neighbor node serving a target cell having the unknown neighbor cell identification, using the neighbor cell identification of the temporary neighbor cell relation; wherein the data requests a response, and if the response is received from the unknown neighbor node, the temporary neighbor cell relation is found valid; otherwise if the response is not received within a certain time period, the temporary neighbor cell relation is found invalid and the temporary neighbor cell relation is dropped;
    wherein if the response is received from the unknown neighbor node, the validity of the temporary neighbor cell relation is verified by checking a distance of the target cell, wherein if the distance between the target cell and the source cell is found to be longer than a specified value, the temporary neighbor cell relation is found invalid, then the temporary neighbor cell relation is dropped; otherwise if the distance between the target cell and the source cell is found to be shorter than the specified value, the temporary cell relation is found valid.

2. Method according to claim 1, further comprising:
    receiving the neighbor cell identification from a user equipment positioned in the source cell served by the network node, or receiving another temporary neighbor cell relation from another network node, the another temporary neighbor cell relation comprising the neighbor cell identification.

3. Method according to claim 1, wherein establishing a permanent neighbor cell relation comprises storing the permanent neighbor cell relation in a neighbor relation table in the network node.

4. Method according to claim 1, further comprising reporting to an operation and maintenance node whether the temporary neighbor cell relation is found valid or invalid.

5. Method according to claim 1, wherein when the temporary neighbor cell relation is found valid a connection is established between the network node and a network node of the target cell.

6. Method according to claim 5, wherein the connection is an X2 connection.

7. Method according to claim 6, wherein the core network node is a mobility management entity (MME).

8. An apparatus in a network node for establishing neighbor cell relations in a wireless network for a source cell served by the network node, the apparatus comprising:
    a receiver configured to receive an unknown neighbor cell identification;
    a first establishing circuitry configured to establish a temporary neighbor cell relation for the received unknown neighbor cell identification;
    a verifying circuitry configured to verify validity of the temporary neighbor cell relation; and
    a second establishing circuitry configured to establish a permanent neighbor cell relation based on the established temporary neighbor cell relation, if the temporary neighbor cell relation is found valid, thus avoiding that a false neighbor cell identification results in a faulty permanent neighbor cell relation,
    wherein the verifying circuitry, for verifying the validity of the temporary neighbor cell relation, is further configured to:

send data to an unknown neighbor node serving a target cell having the unknown neighbor cell identification, using the neighbor cell identification of the temporary neighbor cell relation; wherein the data requests a response, and if the response is received from the unknown neighbor node, the temporary neighbor cell relation is found valid; otherwise if the response is not received within a certain time period, the temporary neighbor cell relation is found invalid and the temporary neighbor cell relation is dropped;

wherein if the response is received from the unknown neighbor node, the validity of the temporary neighbor cell relation is verified by checking a distance of the target cell, wherein if the distance between the target cell and the source cell is found to be longer than a specified value, the temporary neighbor cell relation is found invalid, then the temporary neighbor cell relation is dropped; otherwise if the distance between the target cell and the source cell is found to be shorter than the specified value, the temporary cell relation is found valid.

9. Apparatus according to claim 8, wherein the receiver is arranged to receive the neighbor cell identification from a user equipment positioned in the source cell served by the network node, or to receive another temporary neighbor cell relation from another network node, the another temporary neighbor cell relation comprising the neighbor cell identification.

10. Apparatus according to claim 8, wherein the second establishing circuitry is further arranged to establish a permanent neighbor cell relation by storing the permanent neighbor cell relation in a neighbor relation table in the network node.

11. Apparatus according to claim 8, further comprising a reporting circuitry configured to report to an operation and maintenance node whether the temporary neighbor cell relation is found valid or invalid.

12. Apparatus according to claim 8, wherein when the temporary neighbor cell relation is found valid a connection is established between the network node and a network node of the target cell.

13. Apparatus according to claim 12, wherein the connection is an X2 connection.

14. Apparatus according to claim 13, wherein the core network node is a mobility management entity (MME).

* * * * *

UNITED STATES PATENT AND TRADEMARK OFFICE
CERTIFICATE OF CORRECTION

| | | |
|---|---|---|
| PATENT NO. | : 9,301,224 B2 | Page 1 of 1 |
| APPLICATION NO. | : 14/379402 | |
| DATED | : March 29, 2016 | |
| INVENTOR(S) | : Ahlström et al. | |

It is certified that error appears in the above-identified patent and that said Letters Patent is hereby corrected as shown below:

On the Title Page, in Item (75), under "Inventors", in Column 1, Line 1, delete "Ahlstrom," and insert -- Ahlström, --, therefor.

Specification

In Column 2, Lines 12-13, delete "PC's and ECG's" and insert -- PCIs and ECGIs --, therefor.

In Column 2, Line 14, delete "PC's or ECG's." and insert -- PCIs or ECGIs. --, therefor.

In Column 2, Line 25, delete "PC's" and insert -- PCIs --, therefor.

Signed and Sealed this
Ninth Day of August, 2016

Michelle K. Lee
*Director of the United States Patent and Trademark Office*